(No Model.)

J. M. HUCKINS.
PIE PAN.

No. 596,778. Patented Jan. 4, 1898.

WITNESSES

INVENTOR
Josephine M. Huckins
by John Wedderburn
Attorney

UNITED STATES PATENT OFFICE.

JOSEPHINE M. HUCKINS, OF BELLOWS FALLS, VERMONT.

PIE-PAN.

SPECIFICATION forming part of Letters Patent No. 596,778, dated January 4, 1898.

Application filed December 23, 1896. Serial No. 616,777. (No model.)

*To all whom it may concern:*

Be it known that I, JOSEPHINE M. HUCKINS, a citizen of the United States, residing at Bellows Falls, in the county of Windham and State of Vermont, have invented certain new and useful Improvements in Pie-Pans; and I do hereby declare the following to be a full, clear, and exact description of the invention, such as will enable others skilled in the art to which it appertains to make and use the same.

This invention relates to improvements in cooking utensils, and has more particular relation to pie-pan attachments.

The invention consists of certain novel constructions, combinations, and arrangements of parts, all of which will be hereinafter more particularly set forth and claimed.

Figure 1:
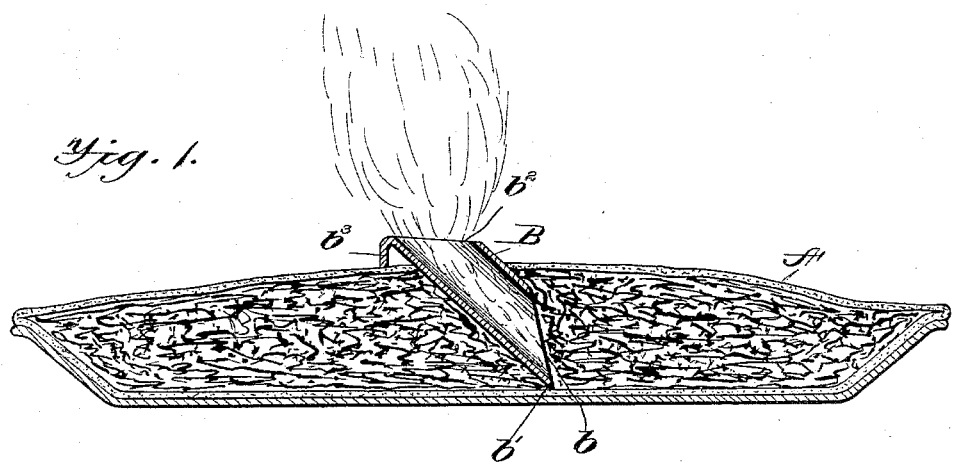
Figure 2:
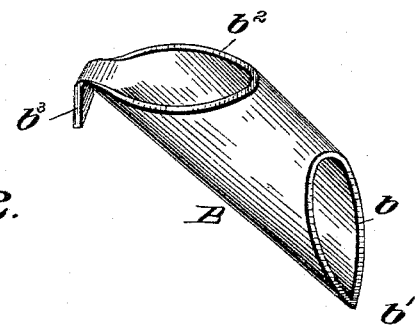

In the accompanying drawings, forming part of this specification, Figure 1 represents a central vertical section through a pie with my invention applied thereto. Fig. 2 represents an enlarged detail perspective view of my said invention.

A in the drawings represents the pie, and B my improved pie attachment. The said attachment comprises a metallic tube B, having an inclined lower open end $b$, formed with a penetrating-point $b'$. The upper end of said tube is also inclined, as at $b^2$, and is provided with a supporting-lip $b^3$, extending at right angles thereto and adapted to rest upon the top of the pie-crust to support the attachment in position within the pie.

In applying my invention to a pie an incision is first made in the top of the pie-crust and the said point $b'$ forced down through the same until the lip $b^3$ contacts with the top of the pie. When in this position, the central opening in the pie will be thus held open and at the same time the steam will be permitted to pass readily into and up through the tube and out at the top of the pie and thus prevent the pie from boiling internally and causing the juices to overflow about the edge. By forming said tube with inclined upper and lower edges the steam is permitted to pass into the said tube from the pie along the greater portion of its length, and at the same time the tube is kept sufficiently clear of all solid substances to permit the steam to readily escape upward.

This invention is very simple and cheap in construction, but when once applied within a pie is very effective and positively prevents the boiling of the pie and the loss of the juices.

Having thus described my invention, what I claim as new, and desire to secure by Letters Patent, is—

1. An attachment for pie-pans comprising a tube having an inclined lower open end formed with a penetrating-point and adapted to permit the steam in the pan to enter it substantially the entire depth of the pan for the purpose herein described.

2. A pie-pan attachment, comprising a tube having a lower pointed end and an upper supporting-lip, and adapted to be inserted into a pie so that the supporting-lip rests upon the upper surface of the pie-crust, substantially as described.

3. A pie-pan attachment comprising a tube having an inclined lower open end, provided with a penetrating-point and an upper inclined open end provided with a supporting-lip, substantially as described.

In testimony whereof I have signed this specification in the presence of two subscribing witnesses.

JOSEPHINE M. HUCKINS.

Witnesses:
PRESTON H. HADLEY,
ALBERT H. CHANDLER.